United States Patent
Kanamarlapudi et al.

(10) Patent No.: US 9,386,528 B2
(45) Date of Patent: Jul. 5, 2016

(54) DISCONTINUOUS RECEPTION MANAGEMENT

(71) Applicant: QUALCOMM Incorporated, San Diego, CA (US)

(72) Inventors: Sitaramanjaneyulu Kanamarlapudi, San Diego, CA (US); Arvindhan Kumar, San Diego, CA (US); Chetan Gopalakrishnan Chakravarthy, San Diego, CA (US); Jimmy Chi-Wai Chui, San Francisco, CA (US); Hemanth Kumar Rayapati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/618,844

(22) Filed: Feb. 10, 2015

(65) Prior Publication Data

US 2015/0365900 A1    Dec. 17, 2015

Related U.S. Application Data

(63) Continuation of application No. 62/010,855, filed on Jun. 11, 2014.

(51) Int. Cl.
*H04W 76/04* (2009.01)
*H04W 52/02* (2009.01)

(52) U.S. Cl.
CPC ........ *H04W 52/0241* (2013.01); *H04W 76/048* (2013.01)

(58) Field of Classification Search
CPC . H04W 52/00; H04W 52/02; H04W 52/0209; H04W 52/0225; H04W 52/0229; H04W 52/0235; H04W 52/0251; H04W 52/0274
See application file for complete search history.

(56) References Cited

U.S. PATENT DOCUMENTS 8,854,976 B2 * 10/2014 Xi et al. .................. 370/241
8,886,232 B2 * 11/2014 Muller et al. ............ 455/458

(Continued)

FOREIGN PATENT DOCUMENTS

| EP | 2 288 109 A1 | 2/2011 |
|---|---|---|
| EP | 2 506 638 A1 | 10/2012 |

OTHER PUBLICATIONS

"3rd Generation Partnership Project ; Technical Specification Group Radio Access Network; Physical channels and mapping of transport channels onto physical channels (TDD) (Release 11)", 3GPP Standard; 3GPP TS 25.221, 3rd Generation Partnership Project (3GPP), Mobile Competence Centre ; 650, Route Des Lucioles ; F-06921 Sophia-Antipolis Cedex ; France, No. V11.0.0, Sep. 18, 2012, pp. 1-232, XP050649177.

(Continued)

*Primary Examiner* — Curtis A Alia
(74) *Attorney, Agent, or Firm* — Arent Fox LLP

(57) ABSTRACT

An example method may include receiving a first subframe. In addition, the example method may include decoding information transmitted in the first subframe. Further, the example method may include switching to an inactive mode subsequent to the completion of the reception of the first subframe. Further still, the example method may include exiting the inactive mode and decoding downlink data transmitted in one or more second subframes in a current reception (Rx) burst time interval when the decoded information transmitted in the first subframe indicates an upcoming transmission of downlink data in the one or more second subframes.

28 Claims, 11 Drawing Sheets

(56) References Cited

U.S. PATENT DOCUMENTS

| | | | |
|---|---|---|---|
| 2009/0316575 A1* | 12/2009 | Gholmieh et al. | 370/225 |
| 2011/0222451 A1* | 9/2011 | Peisa et al. | 370/311 |
| 2011/0280221 A1* | 11/2011 | Chin et al. | 370/335 |
| 2012/0120860 A1* | 5/2012 | Chui | H04B 1/711 370/311 |
| 2013/0077545 A1* | 3/2013 | Chin et al. | 370/311 |
| 2014/0092798 A1 | 4/2014 | Chen et al. | |

OTHER PUBLICATIONS

"3rd Generation Partnership Project; Technical Specification Group Radio Access Network; High Speed Downlink Packet Access (HSDPA); Overall description; Stage 2 (Release 11)", 3GPP Standard; 3GPP TS 25.308, 3rd Generation Partnership Project (3GPP), Mobile Competence Centre ; 650, Route Des Lucioles ; F-06921 Sophia-Antipolis Cedex ; France, vol. RAN WG2, No. V11.8.0, Mar. 14, 2014, pp. 1-76, XP050769938, [retrieved on Mar. 14, 2014].

"3rd Generation Partnership Project; Technical Specification Group Radio Access Network; Physical layer procedures (FDD) (Release 11)", 3GPP Standard; 3GPP TS 25.214, 3rd Generation Partnership Project (3GPP), Mobile Competence Centre ; 650, Route Des Lucioles ; F-06921 Sophia-Antipolis Cedex ; France, vol. RAN WG1, No. V11.8.0, Mar. 14, 2014, pp. 1-128, XP050769974, [retrieved on Mar. 14, 2014].

"3rd Generation Partnership Project; Technical Specification Group Radio Access Network; (Release 12)", 3GPP Standard; 3GPP TS 25.224, 3rd Generation Partnership Project (3GPP), Mobile Competence Centre ; 650, Route Des Lucioles ; F-06921 Sophia-Antipolis Cedex ; France, vol. RAN WG1, No. V12.0.0, Dec. 12, 2013, pp. 1-84, XP050729012, [retrieved on Dec. 12, 2013].

International Search Report and Written Opinion—PCT/US2015/032896—ISA/EPO—Sep. 21, 2015 (15 total pages).

\* cited by examiner

DISCONTINUOUS RECEPTION MANAGEMENT

CROSS-REFERENCE

This is an application claiming priority to Provisional Application No. 62/010,855 entitled "POWER-OPTIMIZED DRX OPERATION IN CELL_FACH STATE" filed Jun. 11, 2014, and assigned to the assignee hereof and hereby expressly incorporated by reference herein.

BACKGROUND

Aspects of the present disclosure relate generally to wireless communication systems, and more particularly, to discontinuous reception management.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

For example, a user equipment (UE) may operate in different radio resource control (RRC) states, including a URA_PCH state and a CELL_FACH state. In the URA_PCH state, the decoding of paging information may involve first monitoring a paging indicator channel (PICH) and then decoding a secondary common control physical channel (SCCPCH) to check a paging channel (PCH) or a paging control channel (PCCH) for possible paging to the UE. The PICH can be decoded and processed offline without having to enable the SCCPCH and related decoding blocks until the PICH processing is done, resulting in very efficient power management from the UE, which extends battery life.

On the other hand, for discontinuous reception (DRX) operation in the CELL_FACH state, the UE may have to concurrently monitor multiple high speed (HS) channels (e.g., high speed-shared control channel (HS-SCCH), high speed-physical downlink shared channel (HS-PDSCH)) because of the overlapping nature of the channels' frame structures. Therefore, unlike the processing of PICH in URA_PCH state, there is no available offline processing for the HS channels. Because the HS channels are awake during each receive burst (Rx burst) period of a DRX cycle wakeup time, the battery of the UE is likely to be drained much more rapidly in DRX operation of CELL_FACH state than during the decoding of paging information in URA PCH state.

Therefore, there is a desire for providing mechanisms that enable power savings when the UE is in DRX operation in the CELL_FACH state.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents examples of techniques for discontinuous reception (DRX) management. An example method may include receiving a first subframe. In addition, the example method may include decoding information transmitted in the first subframe. Further, the example method may include switching to an inactive mode subsequent to the completion of the reception of the first subframe. Further still, the example method may include exiting the inactive mode and decoding downlink data transmitted in one or more second subframes in a current reception (Rx) burst time interval when the decoded information transmitted in the first subframe indicates an upcoming transmission of downlink data in the one or more second subframes.

An example apparatus may include means for receiving a subframe. In addition, the example apparatus may include means for receiving a first subframe. In addition, the example apparatus may include means for decoding information transmitted in the first subframe. Further, the example apparatus may include means for switching to an inactive mode subsequent to the completion of the reception of the first subframe. Further still, the example apparatus may include means for exiting the inactive mode and decoding downlink data transmitted in one or more second subframes in a current reception (Rx) burst time interval when the decoded information transmitted in the first subframe indicates an upcoming transmission of downlink data in the one or more second subframes.

An example computer-readable medium storing computer executable codes for DRX management may include code for receiving a first subframe. In addition, the example computer-readable medium may include code for decoding information transmitted in the first subframe. Further, the example computer-readable medium may include code for switching to an inactive mode subsequent to the completion of the reception of the first subframe. Further still, the example computer-readable medium may include code for exiting the inactive mode and decoding downlink data transmitted in one or more second subframes in a current reception (Rx) burst time interval when the decoded information transmitted in the first subframe indicates an upcoming transmission of downlink data in the one or more second subframes.

Another example apparatus may include a communication component configured to receive a first subframe. In addition, the example apparatus may include a decoder configured to decode information transmitted in the first subframe. Further, the example apparatus may include a reception mode controller configured to switch to an inactive mode subsequent to the completion of the reception of the first subframe, wherein the reception mode controller is configured to exit the inactive mode and the decoder is configured to decode downlink data transmitted in one or more second subframes in a current reception (Rx) burst time interval when the decoded information transmitted in the first subframe indicates an upcoming transmission of downlink data in the one or more second subframes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Different approaches or mechanisms are described below that may be use to enable power savings (e.g., enhance battery performance) when a UE is in DRX operation in the CELL_FACH state. In these approaches, the HS-SCCH may be decoded earlier than the HS-PDSCH to confirm whether the UE is scheduled on HS-PDSCH later in time. Because the initial processing is limited to HS-SCCH, the processing and evaluation related to HS-SCCH may be performed offline without having to enable the blocks, components, and/or modules related to HS-PDSCH, which are typically more computationally intensive and require higher clocks (e.g., involve higher power requirements).

Figure 1:
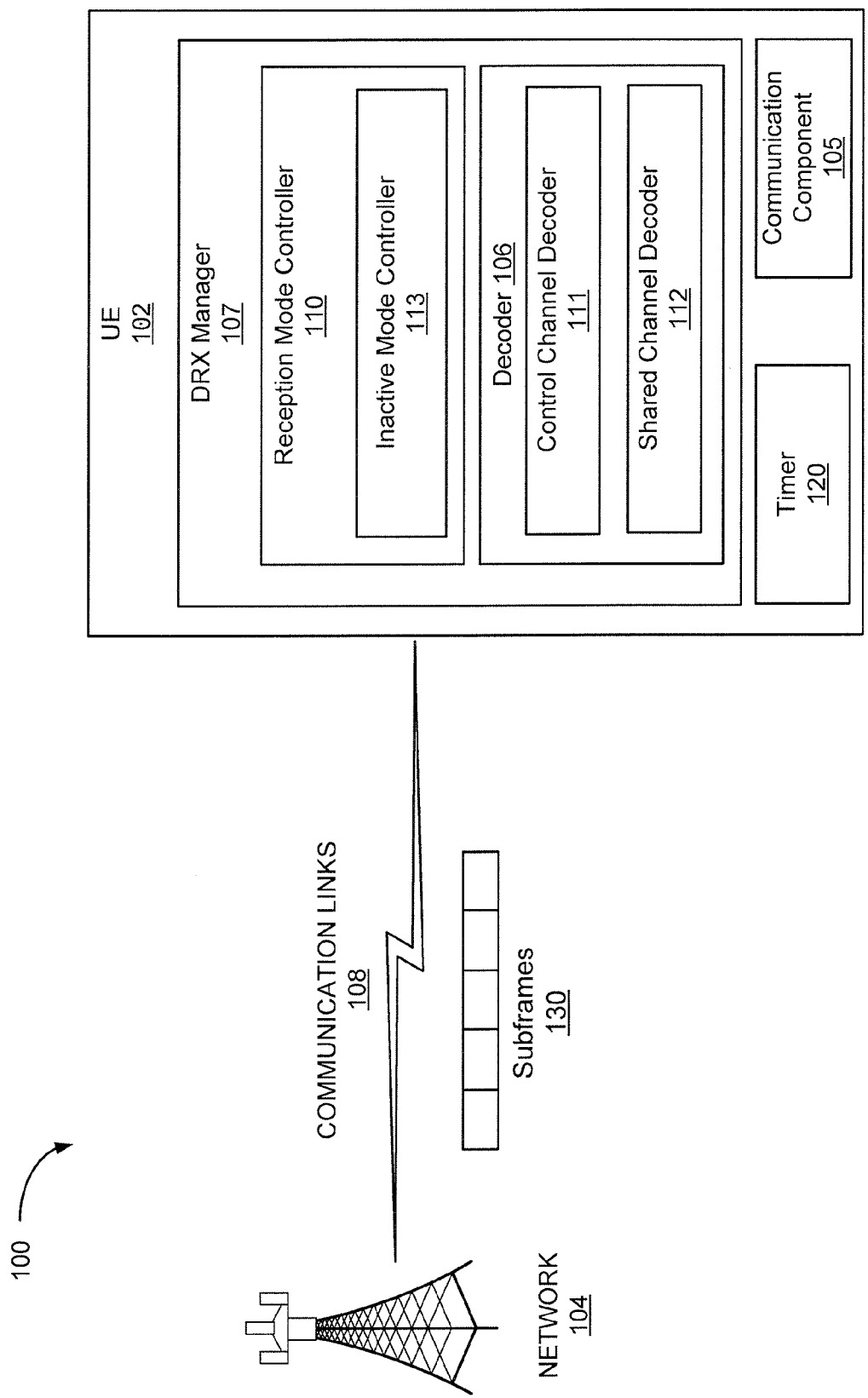
FIG. 1 is a block diagram illustrating a wireless communication system, in which DRX management may be implemented.

Referring to FIG. 1, a wireless communication system 100 may include a UE 102 having one or more components for DRX management. In an aspect, the term "component" as used herein may be one of the parts that make up a system, may be implemented as hardware, software, firmware, or any combination thereof, and may be further divided into other components. By operating in communication with network 104, UE 102 may be in a forward access channel (FACH) state to monitor the FACH to receive signaling messages or user data addressed to the UE or any broadcast message. The signaling messages or user data may be included in one or more subframes 130 transmitted over communication links 108. In some examples, the FACH state may refer to a CELL_FACH state when UE 102 performs DRX operations. UE 102 may include a communication component 105, a timer 120, and a DRX manager 107, which may further include a decoder 106 and a reception mode controller 110. Decoder 106 may further include a control channel decoder 111 and a shared channel decoder 112 respectively configured to decode and process the High Speed Signalling Control Channel (HS-SCCH) and the High Speed Physical Downlink Shared Channel (HS-PDSCH). Reception mode controller 110 may further include an inactive mode controller configured to switch UE 102 to an inactive mode or to cause UE 102 to exit the inactive mode in connection with the reception and/or processing of certain sub frames 130.

In some examples, when UE 102 operates in high speed FACH mode, due to overlapping frame structures of HS channels (e.g., HS-SCCH and HS-PDSCH), UE 102 may need to monitor both the HS-SCCH and the HS-PDSCH until the HS-SCCH is identified for UE 102 or not. HS-SCCH may refer to a channel that carries control information between a network (e.g., network 104) and a UE (e.g., UE 102). The control information may include the UE identity, Hybrid Automatic Repear Request (HARQ), along with other information. HS-PDSCH may refer to a channel that carries user data transmitted from a network (e.g., network 104) to a UE (e.g., UE 102). Once a valid HS-SCCH is identified then UE 102 may continue to monitor the next HS-SCCH and HS-PDSCH subframes for a pre-determined amount of time, for example, a duration of T321 timer defined in LTE standard or a duration specified by timer 120, where timer 120 may, in some instances, correspond to T321 timer. If no valid HS-SCCH is identified then the UE may perform discontinuous reception. As referenced herein, a valid HS-SCCH may refer to a HS-SCCH that indicates an upcoming data transmission.

In an aspect, since HS-SCCH and HS-PDSCH may be transmitted simultaneously during certain time periods, UE 102 may be configured to decode both the HS-SCCH and the HS-PDSCH simultaneously with highest clock implemented in UE 102 to perform high speed decoding and data processing. The time periods in a DRX cycle urin CELL_FACH state in which the HS-SCCH and the HS-PDSCH are transmitted may be referenced as reception burst (Rx burst) or reception burst time intervals (Rx burst time intervals). That is, control channel decoder 111 and shared channel decoder 112 may be configured to respectively decode and process both the HS- SCCH and the HS-PDSCH simultaneously even when the HS-SCCH does not indicate upcoming data transmission over the HS-PDSCH and, therefore, may waste power in unnecessarily processing the HS-PDSCH.

In another aspect, additionally or alternatively, UE 102 and/or DRX manager 107 may be configured to selectively decode HS-SCCH and HS-PDSCH in one or more of the reception burst time intervals. That is, communication component 105 or a receiver of UE 102 may be configured to receive a subframe from network 104. Decoder 106 of DRX manager 107 may be configured to decode HS-SCCH first to determiner if downlink data will transmitted in one of subframes 130 over HS-PDSCH, which may be within or prior to a current reception burst time interval (see e.g., Rx burst 320 in FIG. 3 or Rx burst 406 in FIG. 4).

For example, in accordance with a first approach to reduce the power used for processing HS-SCCH and HS-PDSCH when UE 102 is in CELL-FACH state with DRX operation, decoder 106 and/or control channel decoder 111 may be configured to decode information of HS-SCCH transmitted in a first subframe in time of a current reception burst time interval, the first subframe included in a first frame in time of the current reception burst. Subsequent to the completion of the reception of the subframe, reception mode controller 110 and/or inactive mode controller 113 may be configured to switch UE 102 to an inactive mode (see e.g., sleep period 310 in FIG. 3 or sleep period 411 in FIG. 4), in which reception mode controller 110 may power off one or more receiver chains of UE 102 to reduce power consumption. If the decoded information of HS-SCCH indicates an upcoming data transmission over HS-PDSCH, reception mode controller 110 and/or inactive mode controller 113 may be configured to cause UE 102 to exit the inactive mode at the beginning of a frame subsequent to the aforementioned first frame and maintain in an active mode for a predetermined time period. For example, the predetermined time period may be the duration of a T321 timer and/or the duration of a reception burst time interval. The duration of the T321 timer may be specified by 3GPP specification and stored in timer 120. Meanwhile, decoder 106 and/or shared channel decoder 112 may be configured to decode the downlink data transmitted in the subframes over HS-PDSCH in the predetermined time period.

If the decoded information HS-SCCH does not indicate an upcoming data transmission over HS-PDSCH, reception mode controller 110 and/or inactive mode controller 113 may be configured to maintain UE 102 in the inactive mode until a first subframe in time of a next reception time burst. After the first subframe in time of the next reception time burst, reception mode controller 110 may switch UE 102 to the inactive mode again.

In another example, in accordance with a second approach to reduce the power used for processing HS-SCCH and HS-PDSCH when UE 102 is in CELL-FACH state with DRX operation, decoder 106 and/or control channel decoder 111 may be configured to decode information of HS-SCCH in a subframe transmitted at a fixed time prior to a start of the current reception burst time interval of the current DRX cycle. For example, decoder 106 and/or control channel decoder 111 may be configured to decode information of HS-SCCH in a subframe transmitted 10 milliseconds (or five subframes) prior to the start of the current reception burst time interval. Subsequent to the completion of the reception of the subframe, reception mode controller 110 may be configured to switch UE 102 to the inactive mode. If the decoded information of HS-SCCH indicates an upcoming data transmission over HS-PDSCH, reception mode controller 110 and/or inactive mode controller 113 may be configured to cause UE 102 to exit the inactive mode at the beginning of the current reception burst time interval and maintain in the active mode for the predetermined time period. Decoder 106 and/or shared channel decoder 112 may be configured to decode the downlink data transmitted in the subframes over HS-PDSCH in the predetermined time period.

Figure 4:
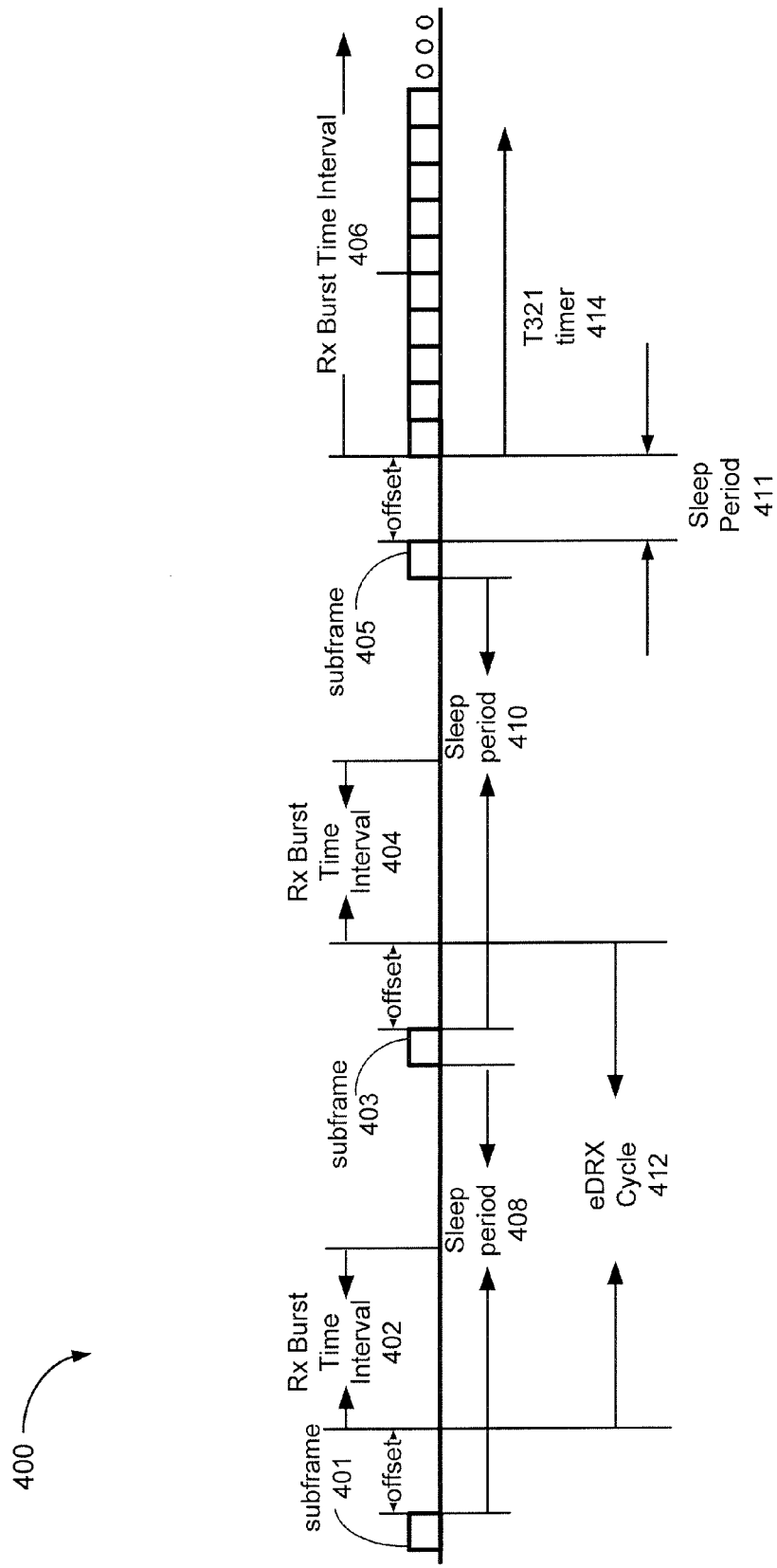
FIG. 4 is a time diagram illustrating a second approach of DRX management in accordance with aspects of the present disclosure.

If the decoded information of HS-SCCH does not indicates an upcoming data transmission over HS-PDSCH, reception mode controller 110 may be configured to maintain UE 102 in the inactive mode until a subframe transmitted 10 milliseconds prior to a next reception burst time interval (e.g., an Rx burst time interval after the Rx burst 406 in FIG. 4).

In at least some examples, since HS-PDSCH may be transmitted in subframes within the current reception burst time interval or subsequent to the current reception burst time interval, decoder 106, or shared channel decoder 112, may be configured to decode HS-PDSCH transmitted in the current reception burst time interval or in one or more subframes subsequent to the current reception burst time interval.

Figure 2:
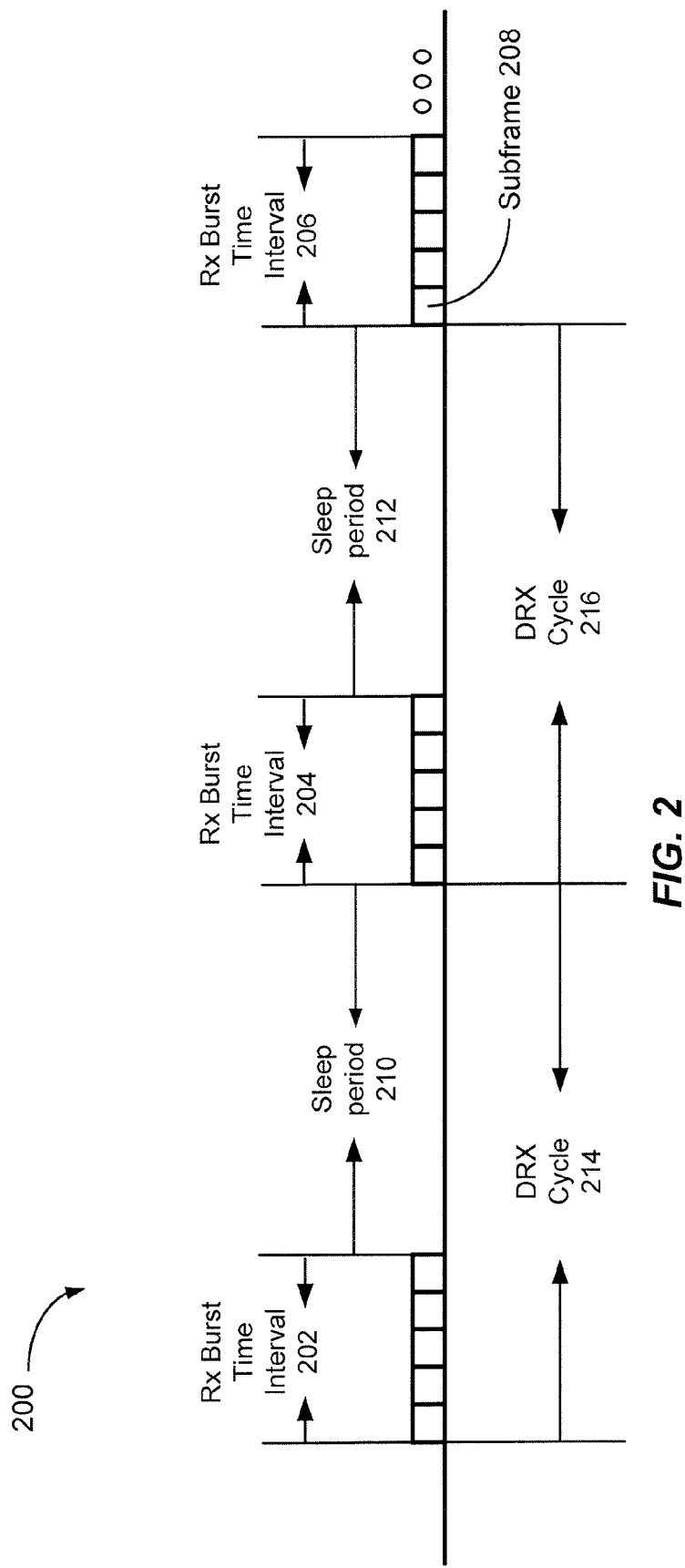
FIG. 2, is a time diagram illustrating an approach of DRX management.

Referring to FIG. 2, an example time diagram 200 of an approach used for DRX operation is illustrated. As depicted, during each Rx burst time interval, e.g., Rx burst time interval 202, 204, and 206, control channel decoder 111 and shared channel decoder 112 may decode their respective downlink channels simultaneously or concurrently. Subsequent to the decoding of the downlink channels, inactive mode controller 113 may be configured to switch UE 102 to an inactive mode during a sleep period, e.g., sleep periods 210 and 212 of a DRX cycle, e.g., DRX cycle 214 or 216. Further, if a valid HS-SCCH is detected in a subframe, e.g., subframe 208, UE 102 and/or shared channel decoder 112 may be configured to continuously monitor or decode one or more subframes over HS-PDSCH after the corresponding Rx burst time interval.

Figure 3:
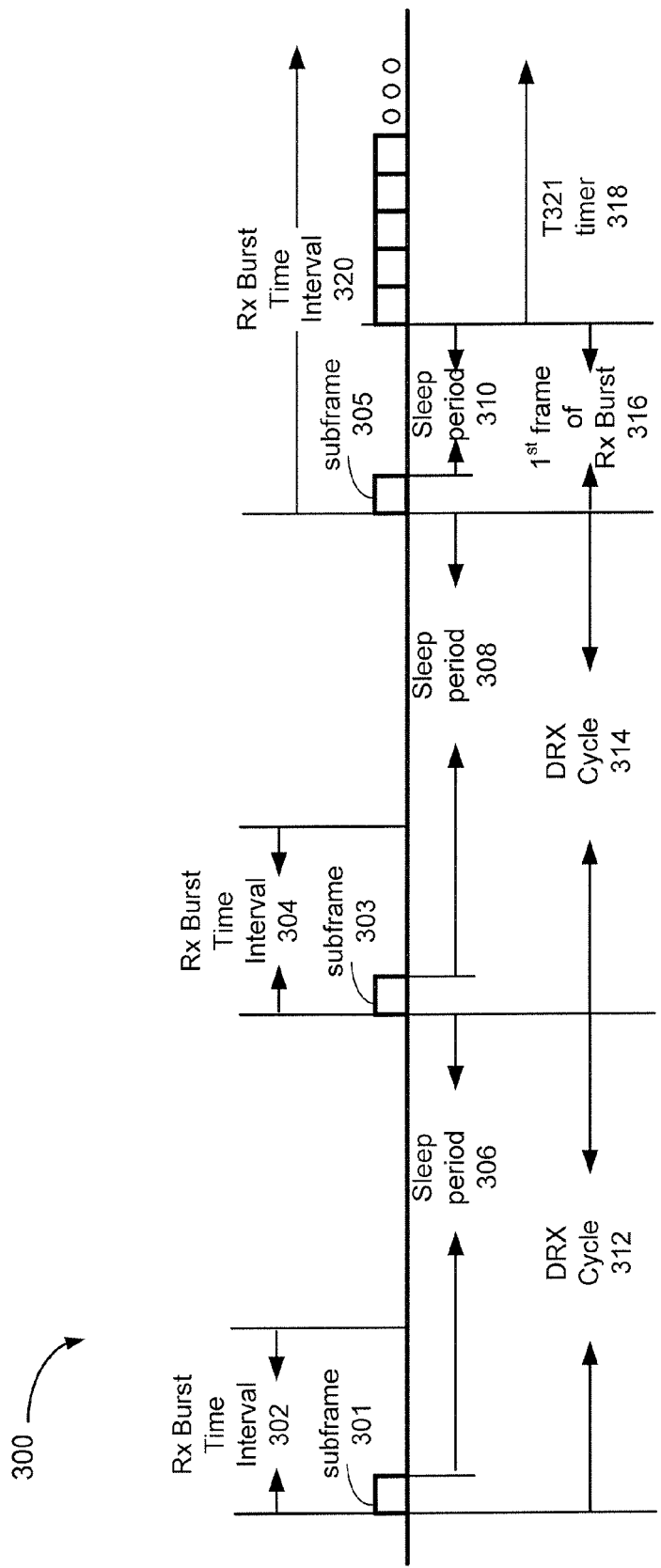
FIG. 3 is a time diagram illustrating a first approach of DRX management in accordance with aspects of the present disclosure.

Referring to FIG. 3, an example time diagram 300 is illustrated for a first approach to reduce the power used for processing HS-SCCH and HS-PDSCH when UE 102 is in CELL-FACH state with DRX operation in accordance with the present disclosure.

As depicted, reception mode controller 110 may cause UE 102 to exit the inactive mode at the beginning of each DRX cycles in CELL-FACH state, e.g., eDRX cycle 312 and 314. Decoder 106 may be configured to decode information in the first subframe over HS-SCCH in time of a respective reception burst time interval, e.g., Rx burst 302 and 304. Whether or not the decoded information in the first subframe of HS-SCCH indicates an upcoming data transmission over HS-PDSCH, reception mode controller 110 may switch UE 102 to the inactive mode subsequent to the completion of the reception of the first subframe, e.g., subframe 301 or subframe 303. The upcoming data transmission may indicate both HS-SCCH and HS-PDSCH to be transmitted to UE 102 in one or more upcoming subframes. As referenced herein, a time interval in which UE 102 operates in an inactive mode may be referred to as a sleep period.

In an aspect, the decoded information may refer to information included in a decoded HS-SCCH subframe. If the decoded HS-SCCH subframe indicates the upcoming data transmission over HS-PDSCH, e.g., subframe 305 indicating the upcoming data transmission, reception mode controller 110 may switch UE 102 to the active mode at the beginning of a frame subsequent to the first frame (e.g., 1$^{st}$ frame of Rx Burst 316) of the current reception burst time interval, e.g., Rx burst 320, and maintain UE 102 for a predetermined time period, e.g., T321 timer 318. Decoder 106 may be configured to decode the subframes in the predetermined time period, the subframes including HS-SCCH and HS-PDSCH. In some examples, shared channel decoder 112 may be configured to process or decode HS-PDSCH in the predetermined time period.

If the decoded HS-SCCH subframe does not indicate the upcoming data transmission over HS-PDSCH, reception mode controller 110 may maintain UE 102 in the inactive mode until the next reception burst time interval. For example, UE 102 may be maintained in the inactive mode in sleep periods 306 and 308.

Referring to FIG. 4, an example time diagram 400 is illustrated for a second approach to reduce the power used for processing HS-SCCH and HS-PDSCH when UE 102 is in CELL-FACH state with DRX operation in accordance with the present disclosure.

As depicted, reception mode controller 110 may be configured to switch UE 102 to an active mode 10 milliseconds (or five subframes) before each reception burst time interval, e.g., Rx burst 402 and 404. 10 milliseconds or 5 subframes is one example shown here and can be any number of subframes ahead in advance can be used based on the complexity and implementation. Decoder 106 may be configured to decode information over HS-SCCH in the subframe 10 milliseconds (or five subframes) before each reception burst time interval, e.g., subframe 401 and 403. Whether or not the decoded information indicates an upcoming data transmission over HS-PDSCH, reception mode controller 110 may switch UE 102 to an inactive mode subsequent to the completion of the reception of the subframe.

If the decoded information indicates an upcoming data transmission over HS-PDSCH, e.g., subframe 405 indicating the upcoming transmission, reception mode controller 110 may switch UE 102 at the beginning of the current reception burst time interval, e.g., Rx burst 406, and may maintain UE 102 for a predetermined time period, e.g., T321 timer 414. Decoder 106 may be configured to decode the subframes transmitted in the predetermined time period, the subframes including HS-SCCH and HS-PDSCH.

If the decoded information (e.g., data in subframe 401 and 403) does not indicate an upcoming data transmission over HS-PDSCH, reception mode controller 110 may be configure to maintain UE 102 in the inactive mode until the subframe transmitted 10 milliseconds (or five subframes) prior to the next reception burst time interval. For example, UE 102 may be maintained in the inactive mode in sleep periods 408 and 410.

Figure 5A:
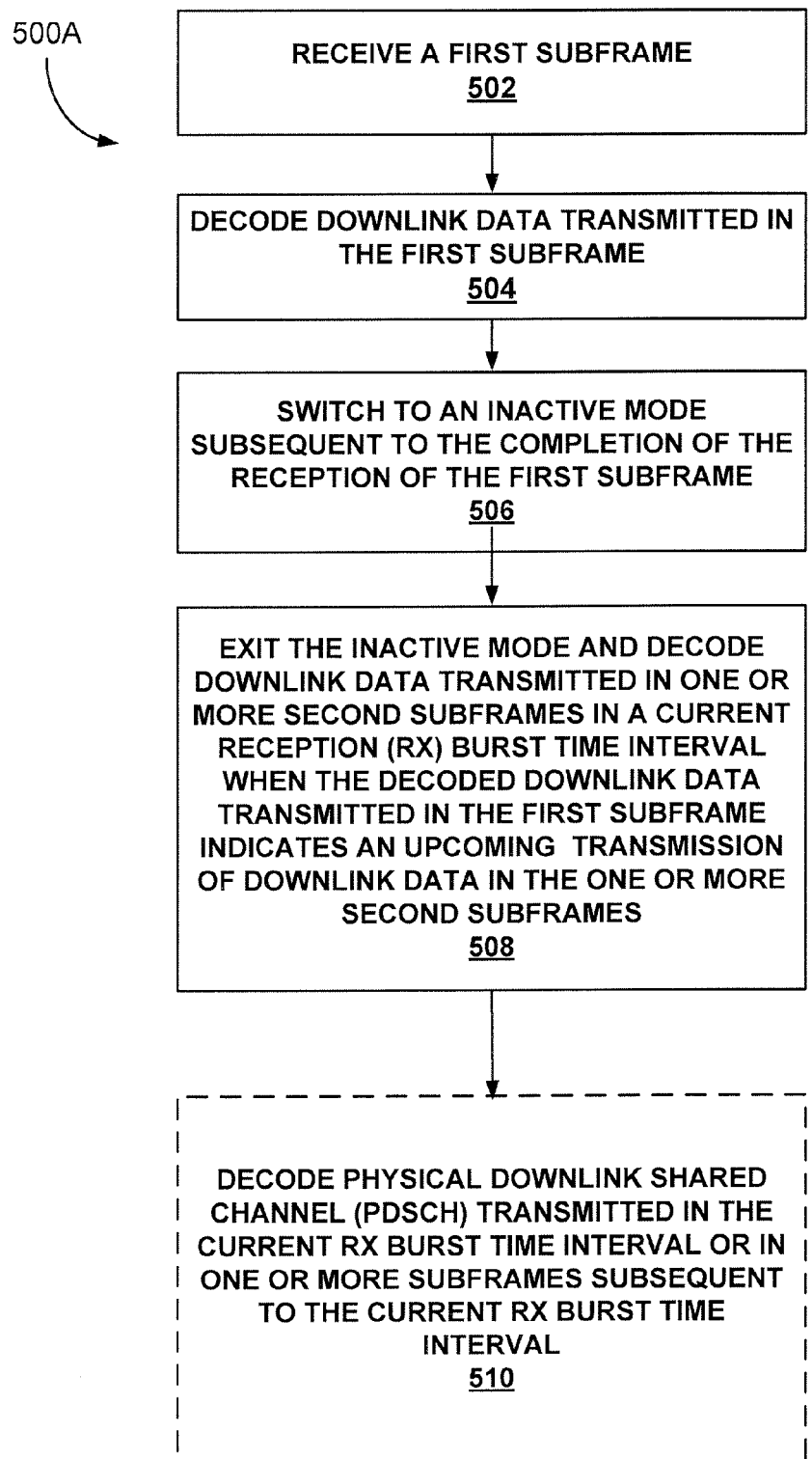
FIG. 5A is a flow chart of aspects of a method for DRX management.

Referring to FIG. 5A, aspects of a method 500A for DRX management may be performed by UE 102 of FIG. 1 and the components thereof. In an aspect, UE 102 may perform method 500A in CELL_FACH state. More particularly, aspects of method 500A may be performed by DRX manager 107 that includes decoder 106, reception mode controller 110, and shared channel decoder 112 as shown in FIG. 1. As illustrated in FIG. 5A, dash-lined blocks may indicate optional operations of method 500A.

At 502, method 500A includes receiving a first subframe over HS-SCCH. For example, communication component 105 may be configured to receive a subframe from network 104.

At 504, method 500A includes decoding information transmitted in the first subframe. For example, in accordance with a first approach to reduce the power used for processing HS-SCCH and HS-PDSCH when UE 102 is in CELL-FACH state with DRX operation, decoder 106 may be configured to decode information of HS-SCCH transmitted in a first subframe in time of a current reception burst time interval, the first subframe included in a first frame in time of the current reception burst time interval. In another example, in accordance with a second approach to reduce the power used for processing HS-SCCH and HS-PDSCH when UE 102 is in CELL-FACH state with DRX operation, decoder 106 may be configured to decode information of HS-SCCH in a subframe transmitted at a fixed time prior to a start of the current reception burst time interval.

At 506, method 500A includes switching to an inactive mode subsequent to the completion of the reception of the subframe. For example, subsequent to the completion of the reception of subframe 301, reception mode controller 110 may be configured to switch UE 102 to an inactive mode, in which reception mode controller 110 may power off one or more receiver chains of UE 102 to reduce power consumption.

At 508, method 500A includes exiting the inactive mode and decoding downlink data transmitted in one or more second subframes in an Rx burst time interval when the decoded information transmitted in the first subframe indicates an upcoming transmission of downlink data in the one or more second subframes For example, in accordance with the first approach to reduce the power used for processing HS-SCCH and HS-PDSCH when UE 102 is in CELL-FACH state with DRX operation, if the decoded information, e.g., decoded HS-SCCH subframe, indicates an upcoming data transmission over HS-PDSCH, reception mode controller 110 may be configured to cause UE 102 to exit the inactive mode at the beginning of a frame subsequent to the aforementioned first frame (1$^{st}$ frame of Rx burst 316) and maintain in an active mode for a predetermined time period, e.g., the duration of a T321 timer or the duration of a reception burst time interval. Meanwhile, decoder 106 may be configured to decode the downlink data of HS-PDSCH transmitted in the subframes in the predetermined time period.

In another example, in accordance with the second approach to reduce the power used for processing HS-SCCH and HS-PDSCH when UE 102 is in CELL-FACH state with DRX operation, if the decoded information indicates an upcoming data transmission, reception mode controller 110 may be configured to cause UE 102 to exit the inactive mode at the beginning of the current reception burst time interval and maintain in the active mode for the predetermined time period.

At 510, method 500A includes decoding physical downlink shared channel (PDSCH) transmitted in the current reception burst time interval or in one or more subframes subsequent to the current reception burst time interval. For example, decoder 106 may be configured to decode PDSCH in the subframes transmitted in the predetermined time period. In some examples, shared channel decoder 112 may be configured to process or decode HS-PDSCH in the predetermined time period.

Figure 5B:
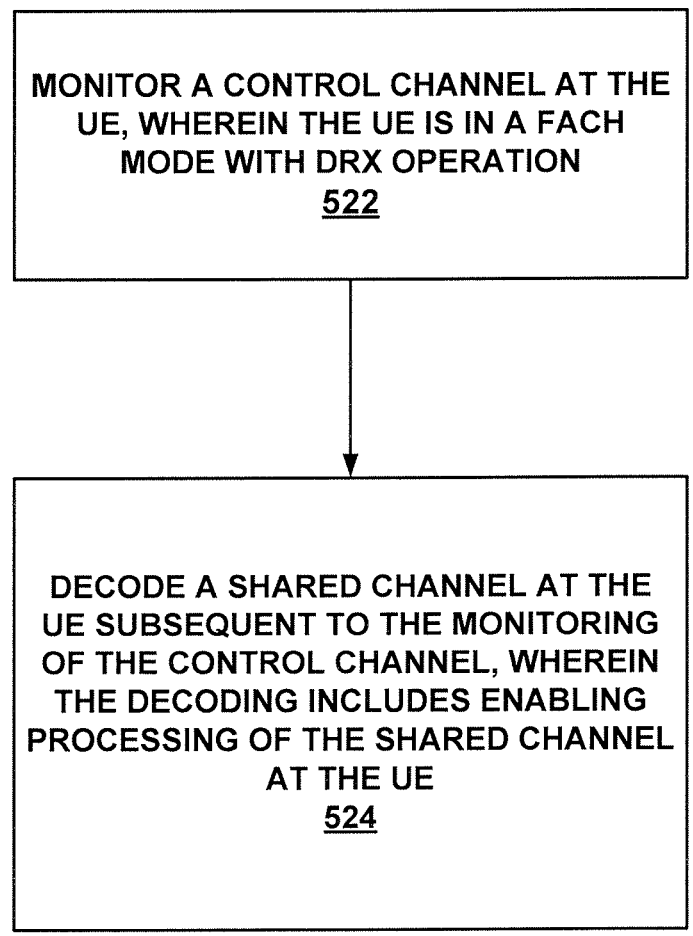
FIG. 5B is another flow chart of aspects of a method for DRX management.

Referring to FIG. 5B, aspects of a method 500B for DRX management may be performed by UE 102 of FIG. 1 and the components thereof. In an aspect, UE 102 may perform method 500B in CELL_FACH state. More particularly, aspects of method 500B may be performed by DRX manager 107 that includes decoder 106, reception mode controller 110, and shared channel decoder 112 as shown in FIG. 1. As illustrated in FIG. 5B, dash-lined blocks may indicate optional operations of method 500B.

At 522, method 500B includes monitoring a control channel at the UE, wherein the UE is in a FACH mode with DRX operation. For example, DRX manager 107, or components thereof, may be configured to monitor a control channel at UE 102 to determine if there is an upcoming data transmission over HS-PDSCH indicated in the control channel. In some examples, the control channel may refer to HS-SCCH.

At 524, method 500B includes decoding a shared channel at the UE subsequent to the monitoring of the control channel, wherein the decoding includes enabling processing of the shared channel at the UE. That is, if the control channel indicates that there will an upcoming transmission of the shared channel, decoder 106 or shared channel decoder 112 may be configured to decode the shared channel at the UE subsequent to DRX manager 107 monitoring the control channel. In some examples, the shared channel may be HS-PDSCH.

Figure 6:
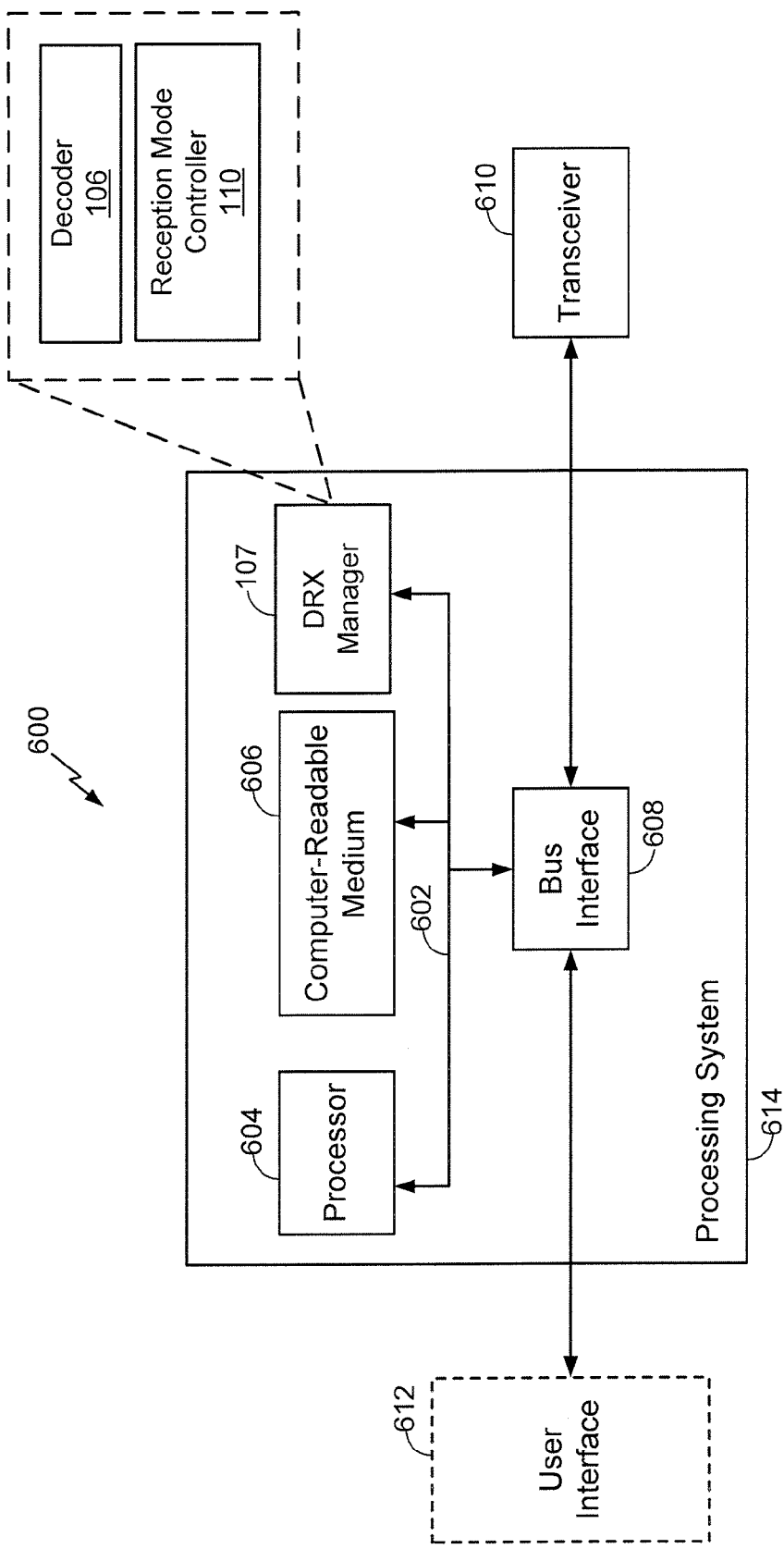
FIG. 6 is a block diagram illustrating an example of a hardware implementation for an apparatus employing a processing system, by which DRX management may be implemented.

Referring to FIG. 6, an example of a hardware implementation for an apparatus 600 employing a processing system 614 having aspects configured for DRX management. In an aspect, apparatus 600 may be a UE 102 of FIG. 1, including a DRX manager 107 having decoder 106 and reception mode controller 110.

In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and one or more communications components, such as, for example, DRX manager 107 of FIG. 1. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software, such as, for example, software modules represented by DRX manager 107.

For example, DRX manager 107 may be configured to monitor a control channel at UE 102 to determine if there is an upcoming data transmission indicated in the control channel. If the control channel indicates that there will an upcoming transmission of the shared channel, decoder 106 or shared channel decoder 112 may be configured to decode the shared channel at the UE subsequent to DRX manager 107 monitoring the control channel.

In another example, communication component 105 of DRX manager 107 may be configured to receive a first subframe. Decoder 106 of DRX manager 107 may be configured to decode information transmitted in the first subframe. Reception mode controller 110 of DRX manager 107 may be configured to switch to an inactive mode subsequent to the completion of the reception of the first subframe. Further, when the decoded information transmitted in the first subframe does not indicate the upcoming transmission of downlink data in the one or more second subframes, reception mode controller 110 is configured to exit the inactive mode and decoder 106 is further configured to decode a first subframe in time of a next Rx burst time interval.

Figure 7:
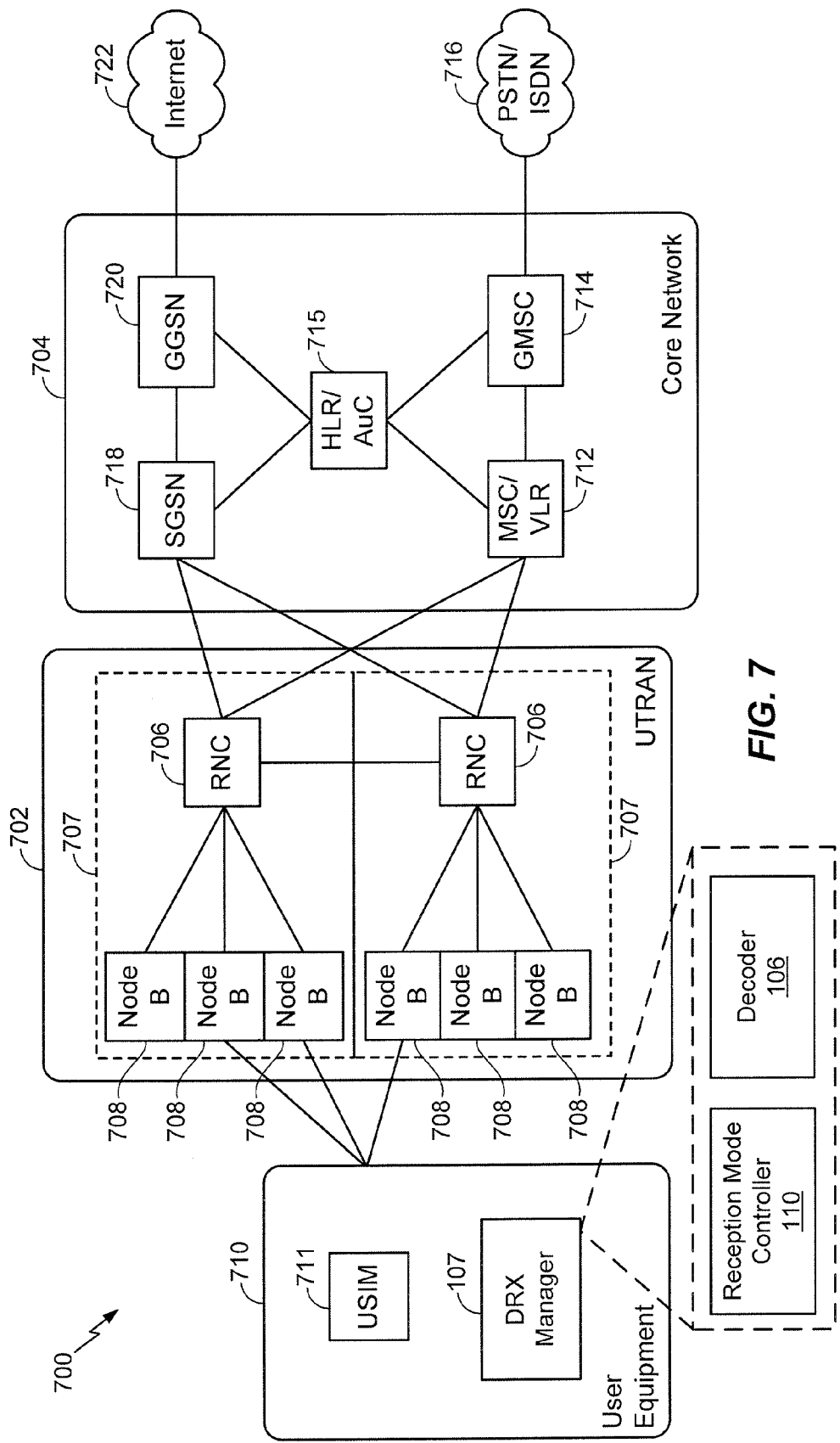
FIG. 7 is a block diagram conceptually illustrating an example of a telecommunications system, in which DRX management may be implemented.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. In an aspect, UE 710 may be an example of UE 102 of FIG. 1, including DRX manager 107 having decoder 106 and reception mode controller 110.

For example, DRX manager 107 may be configured to monitor a control channel at UE 102 to determine if there is an upcoming data transmission indicated in the control channel. If the control channel indicates that there will an upcoming transmission of the shared channel, decoder 106 or shared channel decoder 112 may be configured to decode the shared channel at the UE subsequent to DRX manager 107 monitoring the control channel.

In another example, communication component 105 of DRX manager 107 may be configured to receive a first subframe. Decoder 106 of DRX manager 107 may be configured to decode information transmitted in the first subframe. Reception mode controller 110 of DRX manager 107 may be configured to switch to an inactive mode subsequent to the completion of the reception of the first subframe. Further, when the decoded information transmitted in the first subframe does not indicate the upcoming transmission of downlink data in the one or more second subframes, reception mode controller 110 is configured to exit the inactive mode and decoder 106 is further configured to decode a first subframe in time of a next Rx burst time interval.

In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708, which may be an example of an entity of component of network 104 of FIG. 1, may be considered as including a physical (PHY) layer and a medium access control (MAC) layer. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a Node B 708 to a UE 710, and the UL, also called the reverse link, refers to the communication link from a UE 710 to a Node B 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code

Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the node B 708 over the HS-DPCCH to indicate whether it correctly decoded a packet on the downlink.

HS-DPCCH further includes feedback signaling from the UE 710 to assist the node B 708 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 708 and/or the UE 710 may have multiple antennas supporting MIMO technology. The use of MIMO technology enables the node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
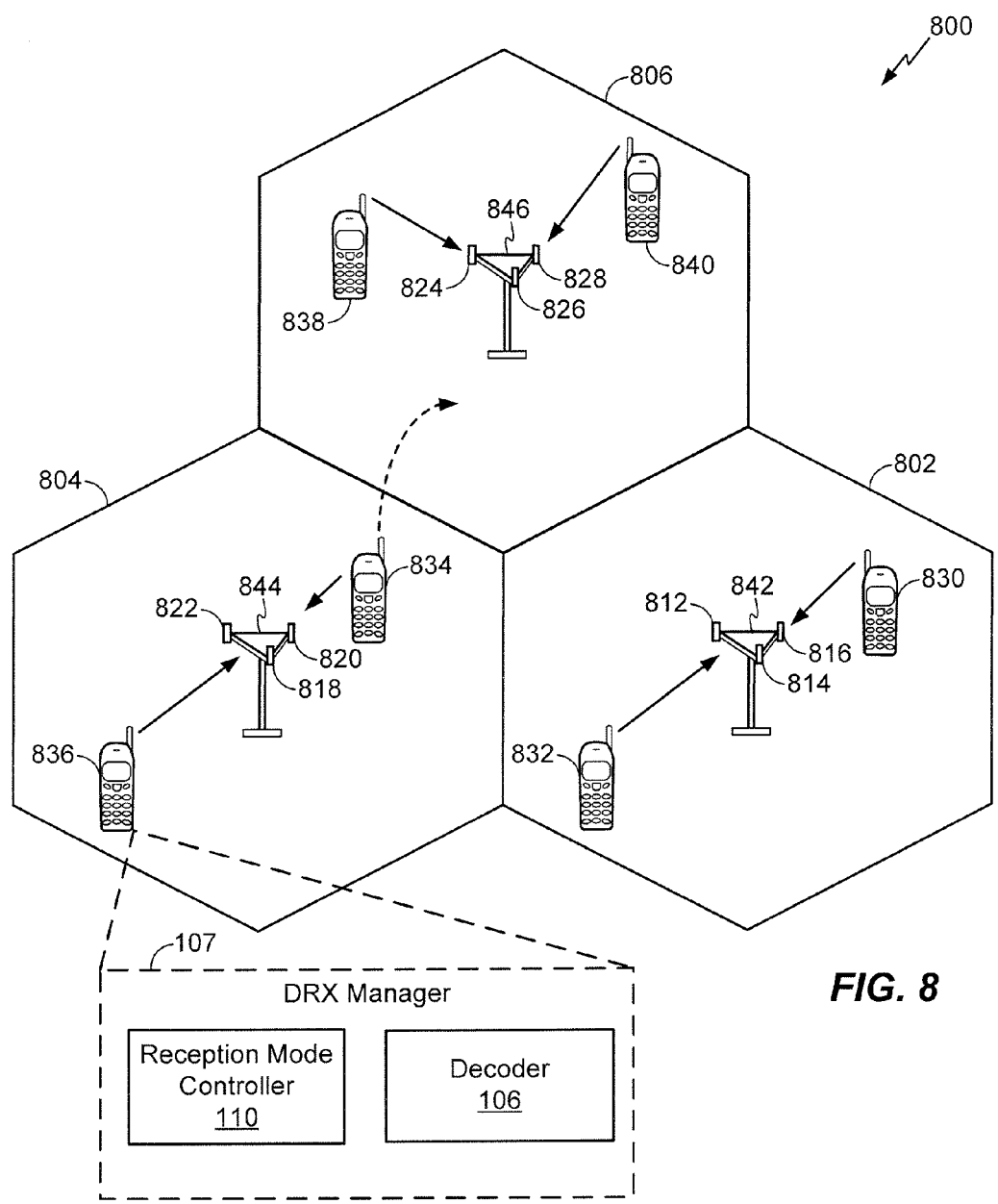
FIG. 8 is a conceptual diagram illustrating an example of an access network, by which DRX management may be implemented.

Referring to FIG. 8, an access network 800 in a UTRAN architecture is illustrated. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with Node B 842, UEs 834 and 836 may be in communication with Node B 844, and UEs 838 and 840 can be in communication with Node B 846. Here, each Node B 842, 844, 846 is configured to provide an access point to a CN 704 (see FIG. 7) for all the UEs 830, 832, 834, 836, 838, 840 in the respective cells 802, 804, and 806. In an aspect, one of UEs 830, 832, 834, 836, 838, and/or 840 may be an example of UE 102 of FIG. 1 including DRX manager 107 having decoder 106 and reception mode controller 110.

For example, DRX manager 107 may be configured to monitor a control channel at UE 102 to determine if there is an upcoming data transmission indicated in the control channel. If the control channel indicates that there will an upcoming transmission of the shared channel, decoder 106 or shared channel decoder 112 may be configured to decode the shared channel at the UE subsequent to DRX manager 107 monitoring the control channel.

In another example, communication component 105 of DRX manager 107 may be configured to receive a first subframe. Decoder 106 of DRX manager 107 may be configured to decode information transmitted in the first subframe. Reception mode controller 110 of DRX manager 107 may be configured to switch to an inactive mode subsequent to the completion of the reception of the first subframe. Further, when the decoded information transmitted in the first subframe does not indicate the upcoming transmission of downlink data in the one or more second subframes, reception mode controller 110 is configured to exit the inactive mode and decoder 106 is further configured to decode a first subframe in time of a next Rx burst time interval.

Here, each Node B 842, 844, and 846 is configured to provide an access point to a CN 704 (see FIG.7) for all the UEs 830, 832, 834, 836, 838, 840 in the respective cells 802, 804, and 806. In an aspect, Node Bs 842, 844, and 846 may be examples of Node Bs included in network 104 of FIG. 1.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 9.

Figure 9:
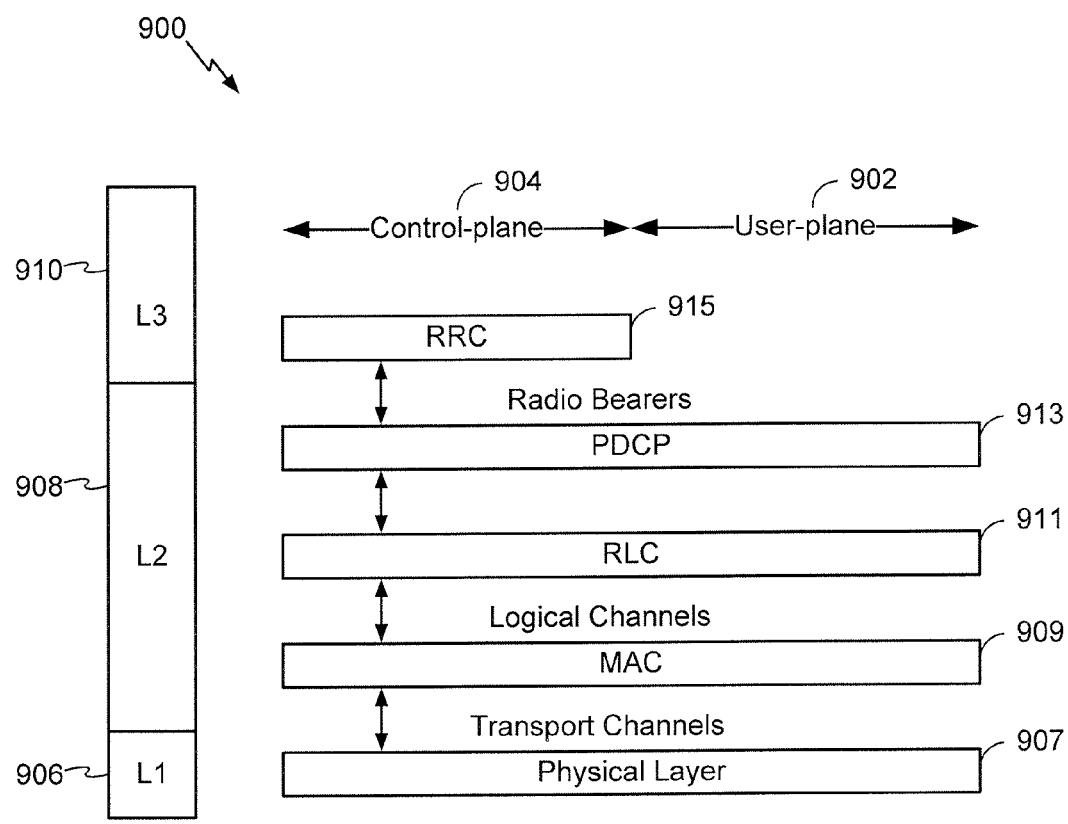
FIG. 9 is a conceptual diagram illustrating an example of a radio protocol architecture for the user and control plane, by which DRX management may be implemented.

Referring to FIG. 9, an example radio protocol architecture 900 relates to the user plane 902 and the control plane 904 of a user equipment (UE) or node B/base station. For example, architecture 900 may be included in a UE such as UE 102 (FIG. 1) including DRX manager 107 having communication component 105, decoder 106, reception mode controller 110, and shared channel decoder 112.

For example, DRX manager 107 may be configured to monitor a control channel at UE 102 to determine if there is an upcoming data transmission indicated in the control channel. If the control channel indicates that there will an upcoming transmission of the shared channel, decoder 106 or shared channel decoder 112 may be configured to decode the shared channel at the UE subsequent to DRX manager 107 monitoring the control channel.

In another example, communication component 105 of DRX manager 107 may be configured to receive a first subframe. Decoder 106 of DRX manager 107 may be configured to decode information transmitted in the first subframe. Reception mode controller 110 of DRX manager 107 may be configured to switch to an inactive mode subsequent to the completion of the reception of the first subframe. Further, when the decoded information transmitted in the first subframe does not indicate the upcoming transmission of downlink data in the one or more second subframes, reception mode controller 110 is configured to exit the inactive mode and decoder 106 is further configured to decode a first subframe in time of a next Rx burst time interval. The radio protocol architecture 900 for the UE and node B is shown with three layers: Layer 1 906, Layer 2 908, and Layer 3 910. Layer 1 906 is the lowest lower and implements various physical layer signal processing functions. As such, Layer 1 906 includes the physical layer 907. Layer 2 (L2 layer) 908 is above the physical layer 907 and is responsible for the link between the UE and node B over the physical layer 907. Layer 3 (L3 layer) 910 includes a radio resource control (RRC) sublayer 915. The RRC sublayer 915 handles the control plane signaling of Layer 3 between the UE and the UTRAN.

In the user plane, the L2 layer 908 includes a media access control (MAC) sublayer 909, a radio link control (RLC) sublayer 911, and a packet data convergence protocol (PDCP) 913 sublayer, which are terminated at the node B on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 913 provides multiplexing between different radio bearers and logical channels. The PDCP sublayer 913 also provides header compression for upper layer data packets to reduce radio transmission overhead, security by ciphering the data packets, and handover support for UEs between node Bs. The RLC sublayer 911 provides segmentation and reassembly of upper layer data packets, retransmission of lost data packets, and reordering of data packets to compensate for out-of-order reception due to hybrid automatic repeat request (HARQ). The MAC sublayer 909 provides multiplexing between logical and transport channels. The MAC sublayer 909 is also responsible for allocating the various radio resources (e.g., resource blocks) in one cell among the UEs. The MAC sublayer 909 is also responsible for HARQ operations.

Figure 10:
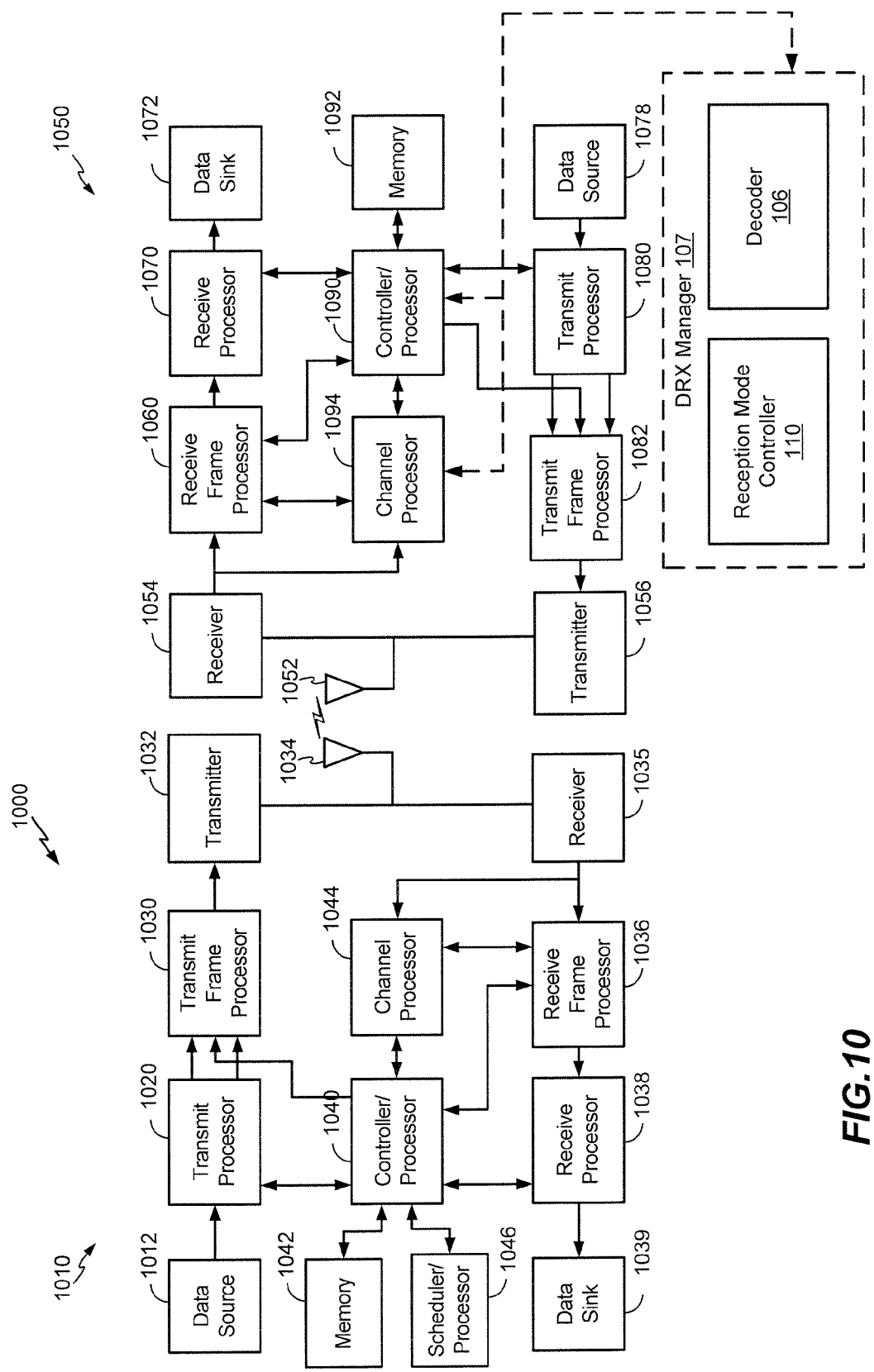
FIG. 10 is a block diagram conceptually illustrating an example of a Node B in communication with a UE in a telecommunications system, in which DRX management may be implemented.

FIG. 10 is a block diagram of a Node B 1010 in communication with a UE 1050, where the Node B 1010 may be an example of a base station associated with network 104 of FIG. 1, and the UE 1050 may be the UE 102 in FIG. 1, having DRX manager 107 having decoder 106 and reception mode controller 110.

For example, DRX manager 107 may be configured to monitor a control channel at UE 102 to determine if there is an upcoming data transmission indicated in the control channel. If the control channel indicates that there will an upcoming transmission of the shared channel, decoder 106 or shared channel decoder 112 may be configured to decode the shared channel at the UE subsequent to DRX manager 107 monitoring the control channel.

In another example, communication component 105 of DRX manager 107 may be configured to receive a first subframe. Decoder 106 of DRX manager 107 may be configured to decode information transmitted in the first subframe. Reception mode controller 110 and/or inactive mode controller 113 may be configured to switch to an inactive mode subsequent to the completion of the reception of the first subframe. Further, when the decoded information transmitted in the first subframe does not indicate the upcoming transmission of downlink data in the one or more second subframes, reception mode controller 110 is configured to exit the inactive mode and decoder 106 is further configured to decode a first subframe in time of a next Rx burst time interval.

In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, or 35 U.S.C. §112(f), whichever is appropriate, unless the element is expressly recited using the phrase "means for" or, in the case of a method claim, the element is recited using the phrase "step for."

What is claimed is:

1. A method for decoding channels at a user equipment (UE), comprising:
   receiving a first subframe in a first channel;
   decoding information transmitted in the first subframe without receiving one or more second subframes in a second channel;
   switching to an inactive mode subsequent to the completion of the reception of the first subframe;
   exiting the inactive mode and decoding downlink data transmitted in the one or more second subframes in the second channel in a current reception (Rx) burst time interval when the decoded information transmitted in the first subframe indicates an upcoming transmission of downlink data in the one or more second subframes in the second channel; and
   decoding physical downlink shared channel (PDSCH) transmitted in one or more subframes subsequent to the current Rx burst time interval based on detecting an upcoming transmission of downlink data in the first channel.

2. The method of claim 1, wherein the first subframe is a subframe transmitted at a fixed time before a start of the current Rx burst time interval.

3. The method of claim 1, wherein the second channel comprises a high-speed physical downlink shared channel (HS-PDSCH) and the one or more second subframes are transmitted in the current Rx burst time interval or in one or more subframes subsequent to the current Rx burst time interval.

4. The method of claim 1, wherein the first channel comprises a high-speed shared control channel (HS-SCCH).

5. The method of claim 1, wherein the first subframe is a first subframe in time of the current Rx burst time interval.

6. The method of claim 5, further comprising:
   maintaining, when the decoded information transmitted in the first subframe does not indicate the upcoming transmission of downlink data in the one or more second subframes, the inactive mode during the current Rx burst time interval; and
   exiting the inactive mode to receive the first subframe in time of the next Rx burst time interval.

7. The method of claim 1, wherein the UE is in a forward access channel (FACH) mode and the inactive mode is associated with discontinuous reception (DRX) operation supported by the UE when in the FACH mode.

8. An apparatus for decoding channels at a user equipment (UE), comprising:
   means for receiving a first subframe in a first channel;
   means for decoding information transmitted in the first subframe without receiving one or more second subframes in a second channel;
   means for switching to an inactive mode subsequent to the completion of the reception of the first subframe;
   means for exiting the inactive mode and decoding downlink data transmitted in the one or more second subframes in the second channel in a current reception (Rx) burst time interval when the decoded information transmitted in the first subframe indicates an upcoming transmission of downlink data in the one or more second subframes in the second channel; and
   means for decoding physical downlink shared channel (PDSCH) transmitted in one or more subframes subsequent to the current Rx burst time interval based on detecting an upcoming transmission of downlink data in the first channel.

9. The apparatus of claim 8, wherein the first subframe is a subframe transmitted at a fixed time before a start of the current Rx burst time interval.

10. The apparatus of claim 8, wherein the second channel comprises a high-speed physical downlink shared channel (HS-PDSCH) and the one or more second subframes are transmitted in the current Rx burst time interval or in one or more subframes subsequent to the current Rx burst time interval.

11. The apparatus of claim 8, wherein the first channel comprises a high-speed shared control channel (HS-SCCH).

12. The apparatus of claim 8, wherein the first subframe is a first subframe in time of the current Rx burst time interval.

13. The apparatus of claim 12, further comprising:
   means for maintaining the inactive mode during the current Rx burst time interval when the decoded information transmitted in the first subframe does not indicate the upcoming transmission of downlink data in the one or more second subframes; and
   means for exiting the inactive mode to receive the first subframe in time of the next Rx burst time interval.

14. The apparatus of claim 8, wherein the UE is in a forward access channel (FACH) mode and the inactive mode is associated with discontinuous reception (DRX) operation supported by the UE when in the FACH mode.

15. A non-transitory computer-readable medium storing computer-executable code for decoding channels at a user equipment (UE), comprising:
- code for receiving a first subframe in the first channel;
- code for decoding information transmitted in the first subframe without receiving one or more second subframes in a second channel;
- code for switching to an inactive mode subsequent to the completion of the reception of the first subframe;
- code for exiting the inactive mode and decoding downlink data transmitted in the one or more second subframes in the second channel in a current reception (Rx) burst time interval when the decoded information transmitted in the first subframe indicates an upcoming transmission of downlink data in the one or more second subframes in the second channel; and
- code for decoding physical downlink shared channel (PDSCH) transmitted in one or more subframes subsequent to the current Rx burst time interval based on detecting an upcoming transmission of downlink data in the first channel.

16. The non-transitory computer-readable medium of claim 15, wherein the first subframe is a subframe transmitted at a fixed time before a start of the current Rx burst time interval.

17. The non-transitory computer-readable medium of claim 15, wherein the second channel comprises a high-speed physical downlink shared channel (HS-PDSCH) and the one or more second subframes are transmitted in the current Rx burst time interval or in one or more subframes subsequent to the current Rx burst time interval.

18. The non-transitory computer-readable medium of claim 15, wherein the first channel comprises a high-speed shared control channel (HS-SCCH).

19. The non-transitory computer-readable medium of claim 15, wherein the first subframe is a first subframe in time of the current Rx burst time interval.

20. The non-transitory computer-readable medium of claim 19, further comprising:
- code for maintaining the inactive mode during the current Rx burst time interval when the decoded information transmitted in the first subframe does not indicate the upcoming transmission of downlink data in the one or more second subframes; and
- code for exiting to the inactive mode to receive the first subframe in time of the next Rx burst time interval.

21. The non-transitory computer-readable medium of claim 15, wherein the UE is in a forward access channel (FACH) mode and the inactive mode is associated with discontinuous reception (DRX) operation supported by the UE when in the FACH mode.

22. An apparatus for decoding channels at a user equipment (UE), comprising:
- a transceiver;
- a memory configured to store data; and
- a processor coupled to the transceiver and the memory, the processor configured to process the data in the memory to:
  - receive, via the transceiver, a first subframe in a first channel;
  - decode information transmitted in the first subframe without receiving one or more second subframes in a second channel;
  - switch to an inactive mode subsequent to the completion of the reception of the first subframe,
  - exit the inactive mode and decode downlink data transmitted in the one or more second subframes in the second channel in a current reception (Rx) burst time interval when the decoded information transmitted in the first subframe indicates an upcoming transmission of downlink data in the one or more second subframes in the second channel; and
  - decode physical downlink shared channel (PDSCH) transmitted in one or more subframes subsequent to the current Rx burst time interval based on detecting an upcoming transmission of downlink data in the first channel.

23. The apparatus of claim 22, wherein the first subframe is a subframe transmitted at a fixed time before a start of the current Rx burst time interval.

24. The apparatus of claim 22, wherein the second channel comprises a high-speed physical downlink shared channel (HS-PDSCH) and the one or more second subframes are transmitted in the current Rx burst time interval or in one or more subframes subsequent to the current Rx burst time interval.

25. The apparatus of claim 22, wherein the first channel comprises a high-speed shared control channel (HS-SCCH).

26. The apparatus of claim 22, wherein the first subframe is a first subframe in time of the current Rx burst time interval.

27. The apparatus of claim 26, wherein the processor is further configured to:
- maintain, when the decoded information transmitted in the first subframe does not indicate the upcoming transmission of downlink data in the one or more second subframes, the inactive mode during the current Rx burst time interval; and
- exiting the inactive mode to receive the first subframe in time of the next Rx burst time interval.

28. The apparatus of claim 27, wherein the UE is in a forward access channel (FACH) mode and the inactive mode is associated with discontinuous reception (DRX) operation supported by the UE when in the FACH mode.

* * * * *